Nov. 1, 1955
G. K. J. BROBERG
2,722,170
ARRANGEMENT FOR SUPPORTING OF VENTILATING
GRILLS AND SIMILAR ELEMENTS
Filed May 16, 1951
2 Sheets-Sheet 1
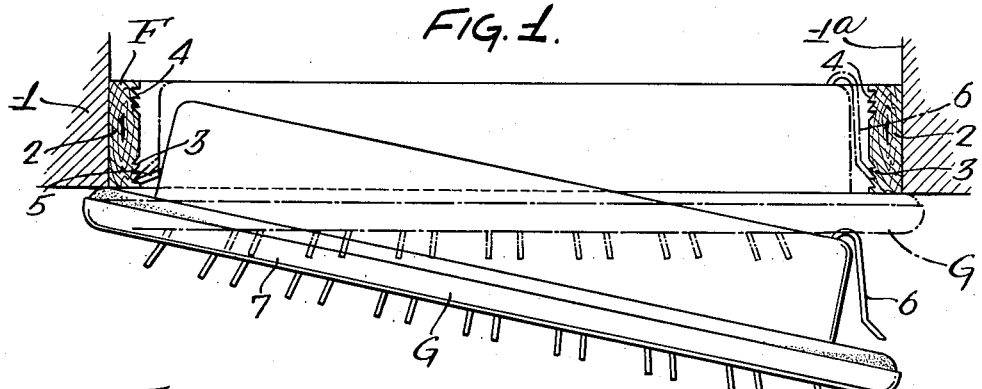
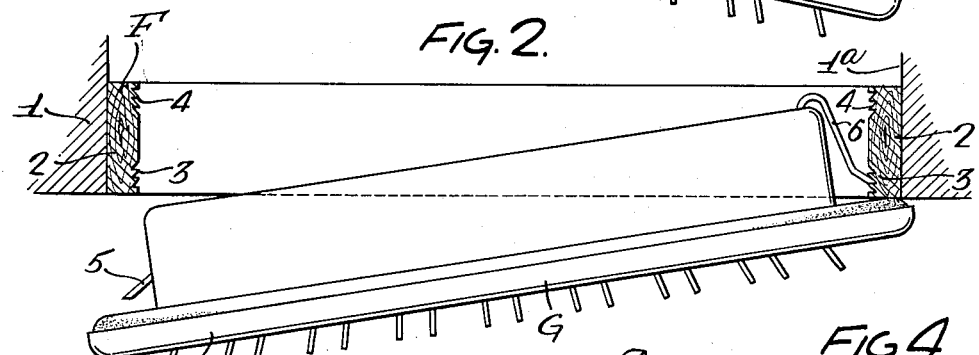
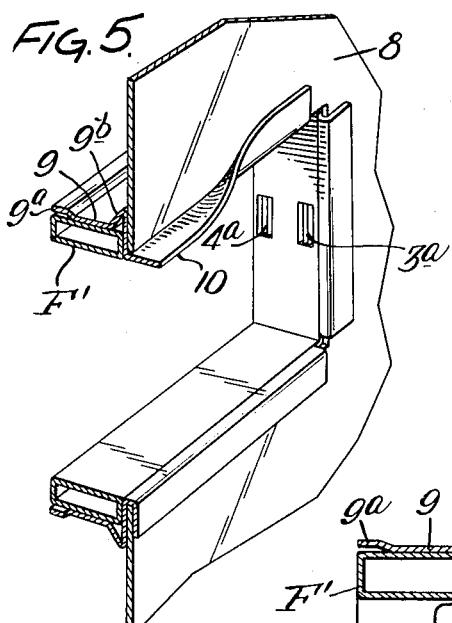
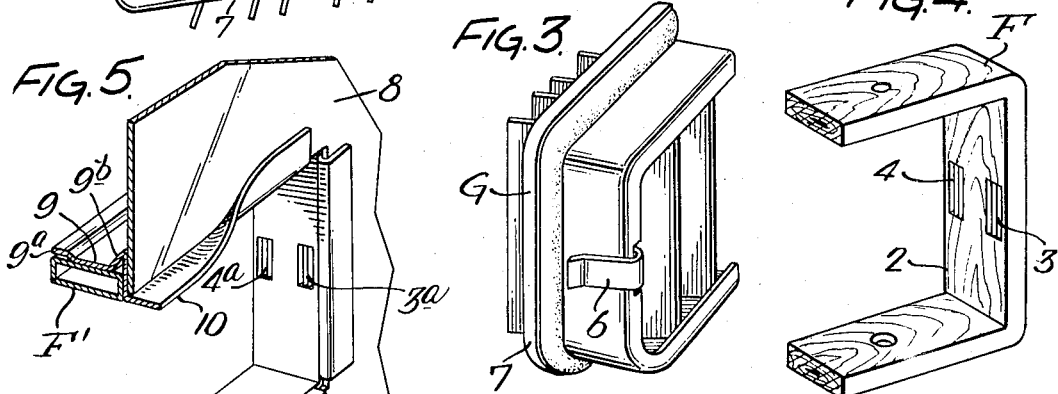
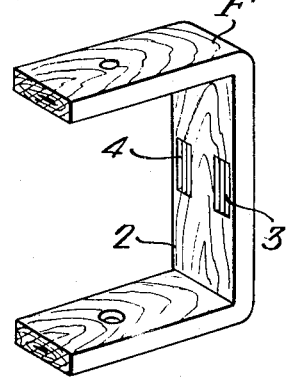
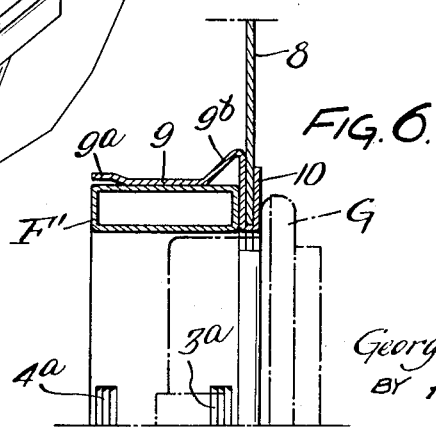
Inventor:
Georg Karl Johan Broberg
By Howson & Howson
ATTYS.

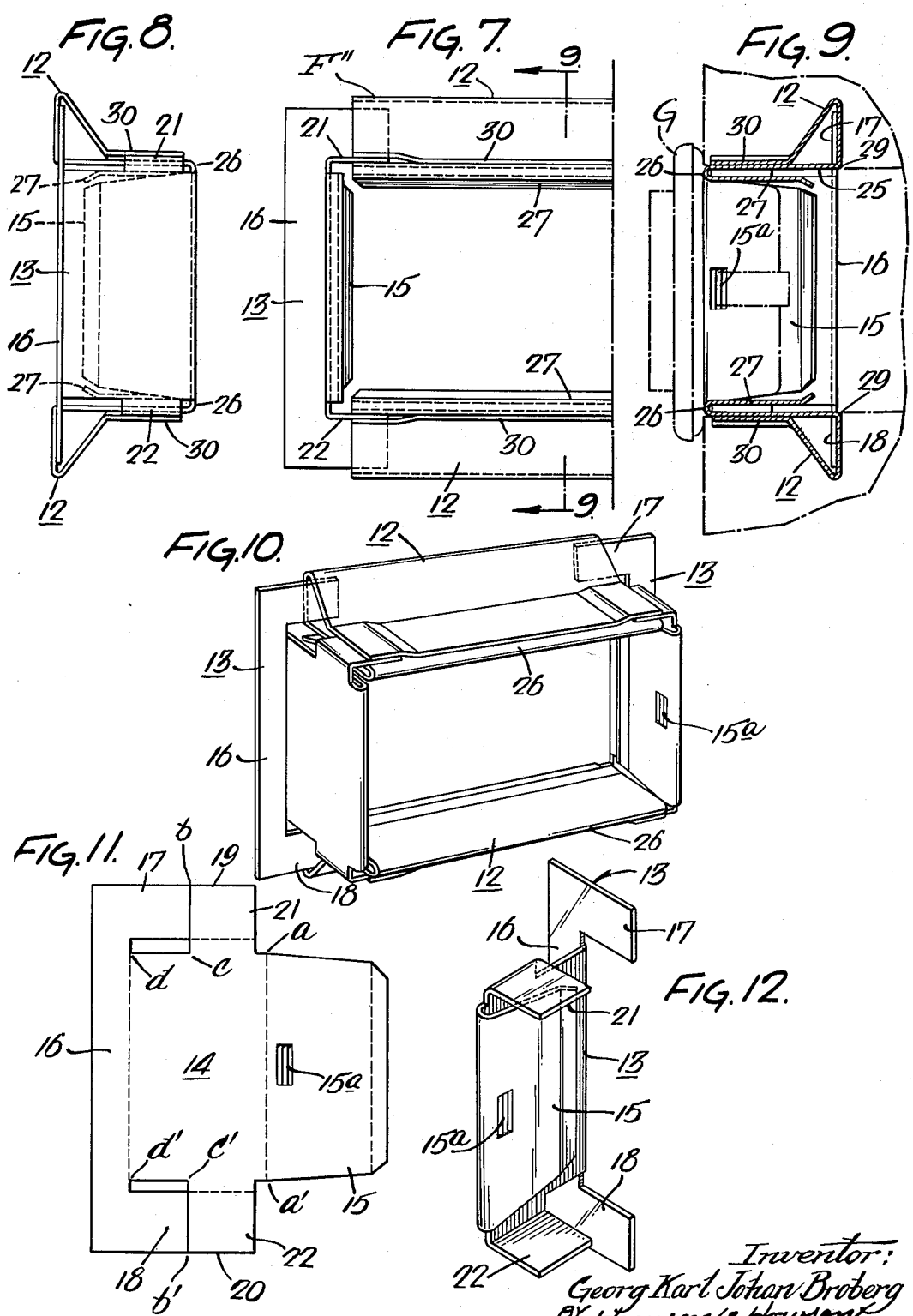

United States Patent Office 2,722,170
Patented Nov. 1, 1955

2,722,170

ARRANGEMENT FOR SUPPORTING OF VENTILATING GRILLS AND SIMILAR ELEMENTS

Georg Karl Johan Broberg, Solna, Sweden, assignor to AB Svenska Fläktfabriken, Stockholm, Sweden Application May 16, 1951, Serial No. 226,583

4 Claims. (Cl. 98—114)

The present invention relates to an arrangement for removably supporting ventilating grills and the like in an opening in a wall or other structure.

Ventilating grills usually are supported in a wall or other opening in which they are removably secured by means of fasteners such as screws. Periodically these grills must be removed, for instance, for cleaning and possibly repainting and the use of tools is required to remove the screw fasteners in order to remove the grills. Not only does this involve loss of time but the use of tools often results in the painted surfaces of the grills being scratched or otherwise damaged by the tools when removing or replacing the grills.

Furthermore, in the case of grills which are secured in place by screw fasteners, entirely different methods and constructions are required depending upon whether the grill is mounted in an opening in a metal place, or in a wood, brick, or stone wall construction. If the grill is permanently incorporated in a brick or stone wall the grill must be of especially strong construction in order to provide adequate support for the overlying brick or stonework.

By the present invention it is possible readily and easily to remove and replace grills without the use of tools and the same construction for removing and replacing the grills may be used for all different types of wall construction.

According to the present invention the grill is mounted in a frame structure permanently secured in an opening in a wall. In one of its dimensions the frame is larger than the corresponding dimension of the grill so that the latter is afforded limited movement within the frame in that direction and the limiting walls of the frame are each provided with a series of teeth extending inwardly from the face of the frame. Provided in the outer surfaces of the grill corresponding to the toothed walls of the frame are a resilient and rigid member, respectively, which are adapted to releasably engage the teeth on said walls of the frame and detachably secure the grill in the frame as hereinafter more fully explained.

In a preferred embodiment of the invention the series of teeth which is provided on each of the opposite limiting walls of the frame is divided into two sections, one section being disposed adjacent one face of the frame with its teeth extending angularly in a direction inwardly away from said one face of the frame and the other section being disposed adjacent the other face of the frame with its teeth extending angularly in a direction inwardly away from said other face of the frame. By this construction the grill may be mounted in the frame from either side thereof.

The invention will now be more fully described with reference to the accompanying drawings, in which:

Fig. 1 is a horizontal sectional view through a grill and frame made according to the present invention showing the first step in procedure for mounting the grill in the frame;

Fig. 2 is a view similar to Fig. 1 showing a step in the procedure for removing the grill from the frame;

Figures 3 and 4 are fragmentary views in perspective showing, respectively, additional details of construction of the grill and frame;

Figs. 5 and 6, respectively, are fragmentary, perspective and sectional views showing the construction and installation of a frame construction for grills which is especially adapted for use in an opening in a plate;

Fig. 7 is a fragmentary elevational view of an alternate frame construction embodying the present invention and especially adapted for use in masonry walls;

Fig. 8 is an end elevational view of the disclosure of Fig. 7;

Figure 9 is a sectional view taken on line 9, Figure 7;

Figure 10 is a view in perspective from the rear of the frame construction shown in Figures 7, 8 and 9;

Fig. 11 is a plan view of the blank of one end piece of the frame shown in Figs. 7 to 10; and Fig. 12 is a perspective view showing the blank of Fig. 11 after it has been formed into one end piece of the frame.

Referring now to the drawings, reference numeral 1 designates a wall structure having an opening 1a therein in which a ventilating grill is to be mounted. Secured in the wall opening 1a is a rectangular frame F the opposite side walls 2 of which are each provided with a series of teeth. The series of teeth on each side wall 2 of the frame is divided into two sections 3 and 4 arranged, respectively, adjacent the front and rear faces of the frame. As shown in Figs. 1 and 2 of the drawings, the teeth of the front section 3 are formed so that they extend angularly inward in a direction away from the front face of the frame, and the teeth of the rear section 4 extend angularly inward of the frame in a direction away from the rear face thereof.

A frame constructed as set forth is adapted to receive a ventilating or like grill G. The grill G conforms to the general shape or configuration of the frame F in which it is to be mounted. However, according to the invention the space between the side walls 2 of the frame is somewhat greater than the corresponding dimension of the grill so that the latter is afforded limited lateral movement within the frame.

Mounted at one end o the grill G and arranged to engage the teeth of one of the front sections 3 is a rigid or non-resilient member or finger 5 which projects angularly forwardly of the grill at an angle corresponding substantially to the angle of disposition of the teeth of said sections 3. At the other end of the grill G there is provided a resilient member or finger 6 having a free end portion which projects at an angle corresponding substantially to the angle of the teeth of the other section 3 at the opposite side of the frame F. The members or fingers 5 and 6 are arranged to engage, respectively, the teeth of the front sections thereof formed on the opposite side walls of the frame F, for example, in the manner shown in Figs. 1 and 2, respectively.

To mount the grill G in the frame F the grill is held in the general position shown in Fig. 1 of the drawings and the non-resilient finger 5 is engaged behind one of the teeth of the front section 3 formed on the adjacent frame wall 2. With the grill thus positioned, the grill is swung in the counterclockwise direction, using the tip of the finger 5 as the pivot point, into the frame to engage the resilient finger 6 behind one of the teeth of the front section 3 formed on the opposite frame wall thereby securely anchoring the grill in the frame. To remove the grill whenever desired, the grill is moved within the frame to the right with respect to Fig. 1 compressing the resilient finger 6 sufficiently to disengage and clear the non-resilient finger 5 from the teeth at the opposite side of the frame. The grill may then be swung in the counterclockwise direction outwardly of the frame and removed as shown in Fig. 2. The grill G has a peripheral flange 7 which overlies and conceals the frame F when mounted therein.

The described construction of the frame F with its front and rear sections of teeth extending angularly inwardly from the adjacent faces of the frame, and the construction of the grill G with its non-resilient and resilient fingers 5 and 6, respectively, makes it possible readily and easily to mount the grill in the frame at either side of the latter and to remove and replace the grill as desired without the use of tools.

Construction of a frame F′ embodying the present invention which is particularly adapted for use in an opening in a plate wall 8 is shown in Figs. 5 and 6 of the drawings. Secured by welding or other means to the outside of the frame F′ is a plate 9 having a raised part 9b which is disposed adjacent to the wall and functions to increase the bearing surface of the frame and stiffening the edge of the sheet metal plate 8. The edge of the plate 9 outwardly of the raised part 9b is provided with a horizontal flange 10 which projects through the opening and then is bent 90° to overlie the front face of the plate 8 as shown in Fig. 5 of the drawings. The rear edge of the plate 9 can be formed as at 9a to provide a narrow channel or recess about the rear frame should such construction be desirable. As in the case of the frame of Figs. 1 and 2, the frame F′ is provided with series of teeth 3a and 4a at opposite sides thereof, constructed and arranged as previously described, for detachably securing the grill G therein.

Figures 8 to 12 illustrate still another frame structure F″ which is particularly adaptable for mounting and supporting a ventilating grill in a masonry wall. The frame essentially comprises identical top and bottom frame members 12, 12 and end frame members 13, 13. In the preferred embodiment they may be formed of sheet metal or the like and arranged in such a manner as to provide interlocking engagement with each other at their respective extremities in assembly. The manner of interlock and the structural shapes of the several components provide the necessary rigidity and strength to the frame structure as well as facilitating the securing of the frame in the wall.

Fig. 11 illustrates a blank comprising one of the end frame members as shown before the several bending operations. A generally rectangular body portion is indicated at 14. Adjacent the lower edge thereof is a tongue 15 which is bent rearwardly along the line a—a′ through an arc of 180° as clearly shown in Fig. 8. This tongue may be provided with notches 15a, as shown in Figures 9, 11 and 12, and they function similarly to those shown at 2 in Fig. 1. The upper edge of the body portion 14 is defined by a line d—d′ which parallels the line a—a′ and defines an edge portion 16 having depending side portions 17, 18 disposed adjacent to and coextensive with the side edges 19 and 20, respectively, of the blank. The blank is lanced along the lines bcd and b′c′d′ adjacent the left and right sides respectively. This permits the edge and side portions 16, 17 and 18 to be bent forwardly together along the line d—d′ through an arc of 90°. The remaining side flaps 21 and 22 adjoining the body portion 14 are also bent along lines parallel to the lines a, c and a′, c′ rearwardly through an arc of 90° to finally form the end frame member 13 as it appears in the drawings.

The top and bottom frame members 12, 12 are uniform in width as viewed in Fig. 7 and have the configuration indicated in section in Fig. 9. In this figure each member 12 is shown as having an intermediate and horizontally disposed body portion 25. One end of this body portion is bent rearwardly at 26 through an arc of 180° to form an extension 27, while the opposite end 28 is bent perpendicularly at 29 and then reversely bent to form a triangular box section with its terminal end 30 lying adjacent to and in the plane of the body portion 25.

In assembly the extended portions 17, 18, 21 and 22 of the end frames 13, 13 are fitted into the ends of the side frame members 12, 12 in a manner shown clearly in Fig. 7 providing the interlocking engagement referred to above. The vertically disposed extensions 17 and 18 are received into the triangular box section of the respective side frames while the flaps 21 and 22 are inserted between the body portions 25 and the overlying edges 30 thereof.

When installed in a wall or the like, the depending members 27, 27 and 15, 15 function as retention members to cooperatively support and retain a ventilating grill of the type disclosed in Figs. 1 and 2.

I claim:
1. A supporting arrangement for ventilating grills and the like comprising a polygonal frame, a grill member conforming to the configuration of the frame and having a continuous peripheral flange projecting outwardly substantially in the plane thereof to overlie the front face of the frame, a packing extending continuously about the rear face of the flange and disposed for sealing engagement with the front face of the frame, said grill member between two sides thereof having a dimension less than the frame to afford limited movement of the grill within the frame between said two sides, and interengaging parts on the frame and grill intermediate the corresponding opposite sides thereof to detachably secure the grill member in the frame, said parts on the frame comprising a series of ratchet teeth protruding inwardly of the frame and the parts on the grill at one side thereof being non-resilient and at the opposite side of the grill being resilient and compressible by movement of the grill in the direction of said opposite side thereof to effect engagement and disengagement of said non-resilient parts at the one side of the grill and thereby secure the latter firmly within the frame in a position inwardly with respect to the front face thereof so that the packing on the flange of the grill is in tight sealing engagement with said front face of the frame.

2. A grill construction as claimed in claim 1 wherein the series of teeth provided on the two opposite sides of the frame are divided into two sections arranged respectively adjacent the front and rear faces of the frame, and the teeth of each section are formed so that they extend angularly inward of the frame in a direction away from the front face of the frame.

3. A grill construction as claimed in claim 1 wherein selected surfaces of the frame have straps secured exteriorly thereof which are formed to provide an upwardly extending projection at and along one edge of the frame and terminating in a horizontally projecting flange portion to extend through an opening in a wall, said flange portion being bendable 90° to overlie the adjacent wall surface.

4. A grill construction as claimed in claim 1 wherein the frame consists in part of a pair of end pieces each having a central portion, a tongue portion at one side of said central portion bent inwardly of the frame parallel to the central portion, a strip portion at the opposite side of said central portion of the end piece from said tongue and having tab portions integral therewith adjacent opposite ends of said central portions and severed therefrom, the said strip portion and its integral tab portions being bent at right angles to the end piece central portion with the strip portion extending from the central portion at the side thereof opposite said tongue portion, and flap portions integral with opposite ends of said central portion of the end piece bent at right angles thereto in the opposite direction from said strip portion.

(References on following page)

References Cited in the file of this patent

UNITED STATES PATENTS

| | | | |
|---|---|---|---|
| 524,310 | Cohen | Aug. 14, | 1894 |
| 723,433 | Arend | Mar. 24, | 1903 |
| 743,633 | Sale | Nov. 10, | 1903 |
| 861,070 | Wynn | July 23, | 1907 |
| 887,543 | Symonds | May 12, | 1908 |
| 1,586,528 | Hoddersen-Balling | June 1, | 1926 |
| 1,600,809 | Durdin, Jr. | Sept. 21, | 1926 |
| 1,815,346 | Covell | July 21, | 1931 |
| 1,863,428 | Westrick | June 14, | 1932 |
| 1,952,707 | Germonprez | Mar. 27, | 1934 |
| 2,039,346 | Reed | May 5, | 1936 |
| 2,058,593 | Karmazin | Oct. 27, | 1936 |
| 2,063,546 | Friedholdt, Jr. | Dec. 8, | 1936 |
| 2,325,458 | Witteman | July 27, | 1943 |
| 2,615,515 | Hoffman | Oct. 28, | 1952 |

FOREIGN PATENTS

| | | | |
|---|---|---|---|
| 165,436 | Switzerland | Jan. 16, | 1934 |